United States Patent [19]
Lee

[11] Patent Number: 6,064,922
[45] Date of Patent: May 16, 2000

[54] UNTETHERED AVIONICS KNEEBOARD INTERFACE DEVICE

[75] Inventor: David A. Lee, Solomons, Md.

[73] Assignee: Rockwell Collins, Inc., Cedar Rapids, Iowa

[21] Appl. No.: 08/934,705

[22] Filed: Sep. 22, 1997

[51] Int. Cl.[7] ..................................................... G06F 19/00
[52] U.S. Cl. .............................. 701/3; 701/200; 701/213; 342/357.06
[58] Field of Search .............................. 701/1, 3, 4, 200, 701/207, 213; 73/178 R; 342/357.01, 357.06, 357.08, 357.09, 419

[56] References Cited

U.S. PATENT DOCUMENTS

| | | | |
|---|---|---|---|
| 3,979,057 | 9/1976 | Katz et al. ............................... | 701/200 |
| 4,827,419 | 5/1989 | Selby, III ................................ | 701/200 |
| 4,977,509 | 12/1990 | Pitchford et al. ........................ | 701/207 |
| 5,268,844 | 12/1993 | Carver et al. ............................ | 701/200 |
| 5,726,663 | 3/1998 | Moyer et al. ............................. | 342/419 |
| 5,819,199 | 10/1998 | Kawai et al. ............................. | 701/213 |
| 5,848,373 | 12/1998 | DeLorme et al. ....................... | 701/200 |
| 5,889,493 | 3/1999 | Endo ....................................... | 701/213 |
| 5,938,721 | 8/1999 | Dussell et al. ........................... | 701/213 |

*Primary Examiner*—Gary Chin
*Attorney, Agent, or Firm*—Nathan O. Jensen; Kyle Eppele; J. P. O'Shaughnessy

[57] ABSTRACT

A kneeboard interface device for use by a pilot of an aircraft in communicating with an avionics suite controller is disclosed. The kneeboard interface device includes a kneeboard controller adapted to control the kneeboard interface device. A wireless I/O device is coupled to the kneeboard controller and adapted to facilitate wireless communication between the kneeboard interface device and the avionics suite controller. A display device is coupled to the kneeboard controller and adapted to display to the pilot avionics suite controller information received from the avionics suite controller. An input device coupled to the kneeboard controller is adapted to receive a pilot response to displayed avionics suite controller information. The pilot response is transmitted to the avionics suite controller by the wireless I/O device to control the avionics suite.

19 Claims, 2 Drawing Sheets

UNTETHERED AVIONICS KNEEBOARD INTERFACE DEVICE

FIELD OF THE INVENTION

The present invention relates generally to aviation electronics (avionics) systems for use in aircraft. More particularly, the present invention relates to a kneeboard interface device for use by pilots Lo control various functions of the aircraft's avionic suite.

BACKGROUND OF THE INVENTION

The complexity of avionics systems has increased greatly over the years. With the increase in integration of complex avionics systems on common avionics buses (i.e., MIL-STD-1550, ARINC-429, MIL-STD-1773), the need has arisen to control the various systems from a common location. At the present time, this common control is accomplished through a control data unit (CDU), a flight management system (FMS), or other types of avionics suite controllers. Due to the available real estate in an aircraft cockpit, the CDU/FMS user interface device is frequently not located in the most convenient position or location for some pilots. Therefore, in order to control the avionics suite, these pilots'work loads are increased by the location of the avionics suite controller user interface device.

SUMMARY OF THE INVENTION

A kneeboard interface device for use by a pilot of an aircraft in communicating with an avionics suite controller is disclosed. The kneeboard interface device includes a kneeboard controller adapted to control the kneeboard interface device. A wireless I/O device is coupled to the kneeboard controller and adapted to facilitate wireless communication between the kneeboard interface device and the avionics suite controller. A display device is coupled to the kneeboard controller and adapted to display to the pilot avionics suite controller information received from the avionics suite controller. An input device coupled to the kneeboard controller is adapted to receive a pilot response to displayed avionics suite controller information. The pilot response is transmitted to the avionics suite controller by the wireless I/O device to control the avionics suite. The kneeboard interface device can preferably be loaded with digital maps, GPS data and other programming, as desired, using PCMCIA cards or other external data transfer devices (DTD).

DETAILED DESCRIPTION OF THE PREFERRED EMBODIMENTS

The present invention reduces the work load of pilots by providing the avionics suite controller interface device in the form of a kneeboard that the pilot can strap to his/her leg, thereby providing a convenient location for the pilot to interface with the avionics suite controller. The avionics kneeboard can be coupled in a wireless fashion, such as using infrared (IR) I/O devices, to the avionics suite controller. The avionics kneeboard of the present invention is untethered to provide freedom of movement for the pilot. Additionally, the avionics kneeboard can provide global positioning system (GPS) and emergency locator transmitter (ELT) functions in order to provide survival information in the case of an emergency landing or bail-out.

Figure 1:
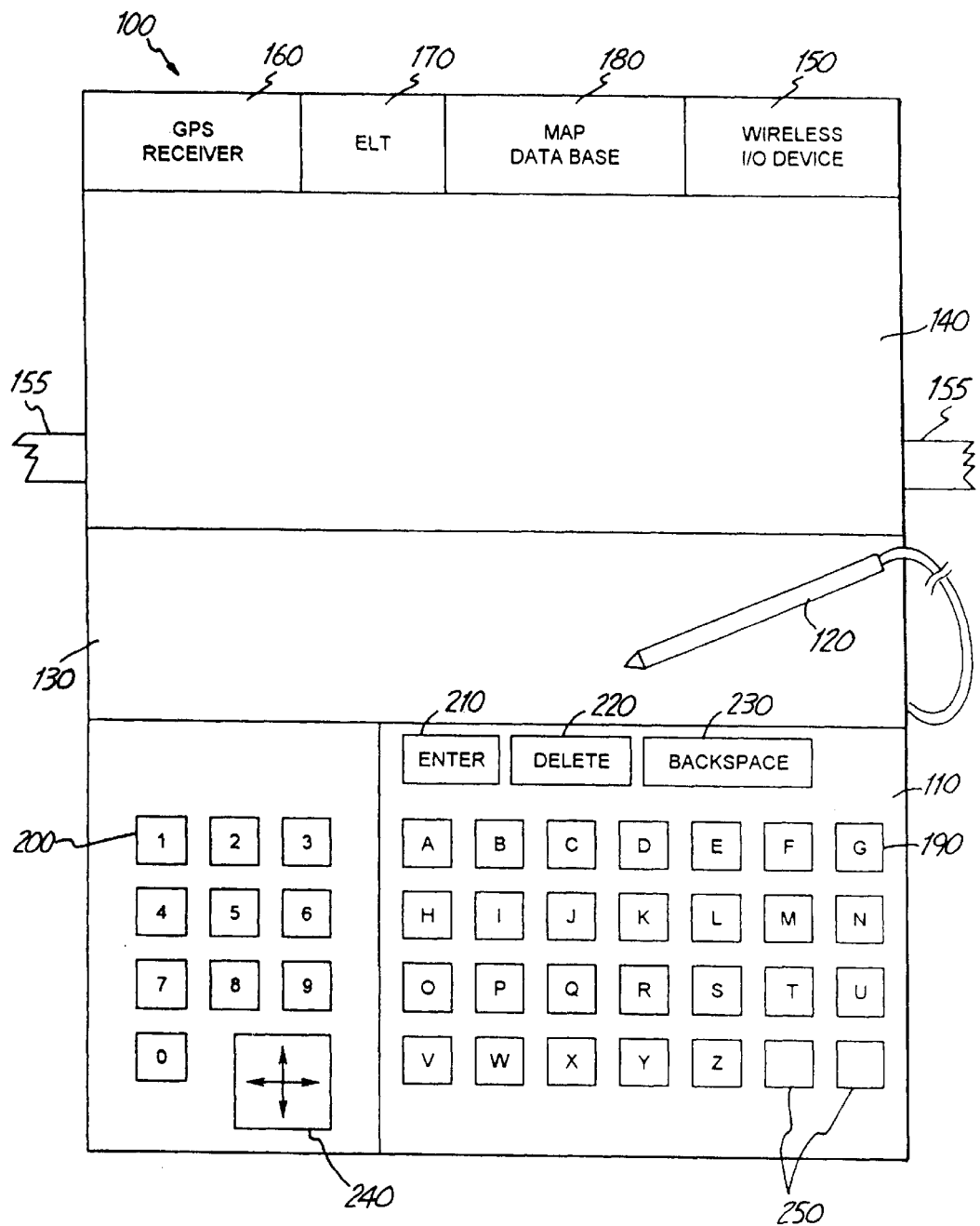
FIG. 1 is a diagrammatic illustration of an untethered avionics kneeboard interface device in accordance with some preferred embodiments of the present invention.

FIG. 1 is a diagrammatic illustration of avionics kneeboard 100, in accordance with preferred embodiments of the present invention, which acts as an interface device between a pilot and an avionics suite controller. In a particular embodiment illustrated in FIG. 1, kneeboard 100 includes alphanumeric keypad 110, light pen 120, light pen writing surface 130, display device 140, wireless I/O device 150 and straps 155. It should be understood that kneeboard 100 need not include all of the above-listed features and components. Further, kneeboard 100 can optionally include GPS receiver 160, ELT 170 and map data base 180.

Alphanumeric keypad 110 includes alphabetic keys 190, numeric keys 200, and other desired keys for use in data entry or menu response. For example, keyboard 110 includes ENTER key 210, DELETE key 220 and BACKSPACE key 230. Further, keyboard 110 includes cursor directional movement key 240 and other keys 250 which can be preprogrammed to perform any of a variety of desired functions relating to the control of the aircraft in which kneeboard 100 is used.

Light pen 120 and electronic writing surface 130 are of the type known in the computer industry. Using light pen 120, the pilot can make written notes on writing surface 130 which are electronically stored within kneeboard 100. Thus, with the aid of kneeboard 100, the pilot does not need a pad and writing utensil as has conventionally been used by pilots without the benefit of kneeboard 100.

Display device 140, which is formed integrally within kneeboard 100, is preferably a liquid crystal display (LCD) or other flat panel color display devices which display aircraft status and control information, provided from the aircraft's avionics suite and avionics suite controller. The information displayed on display device 140 is preferably provided in a menu driven format, allowing the pilot to select from multiple optional courses of action.

Straps 155 are attached to kneeboard 100 and are adapted for attaching kneeboard 100 to the leg of the pilot of the aircraft. Using straps 155, kneeboard 100 can be located in a position which is most convenient for the pilot. This helps to minimize the pilot's work load. This, in turn, helps to increase the pilot's situational awareness.

Wireless I/O device 150 is preferably an infrared (IR) or other device for providing communications between kneeboard 100 and an avionics suite controller. With the aid of wireless I/O device 150, kneeboard 100 remains untethered, thus allowing the pilot freedom of movement. Preferably, wireless I/O device 150 is a device which has low sensitivity to the exact position of the kneeboard, thus allowing the pilot to freely move about the cockpit of the aircraft without interfering with control functions.

GPS receiver 160 is optionally included in kneeboard 100 to aid the pilot in ground navigation if an emergency landing, bail-out or crash is necessary or occurs. With the use of GPS receiver 160, the pilot can ascertain his or her exact position on the ground. Using map data base 180 preprogrammed with digital terrain information for the areas along the intended flight path of the aircraft, in conjunction with GPS receiver 160, the pilot and any passengers of the aircraft can be guided to safety after an unscheduled landing. Further, ELT 170 is provided in kneeboard 100 and is adapted to transmit the location of the pilot to a command center to facilitate rescue of the pilot, crew and passengers. Further, ELT 170 can transmit information from the pilot, entered using keyboard 110, to the rescue command center. In this manner, the pilot can inform the rescue command center of any injuries or particular needs of those stranded.

Figure 2:
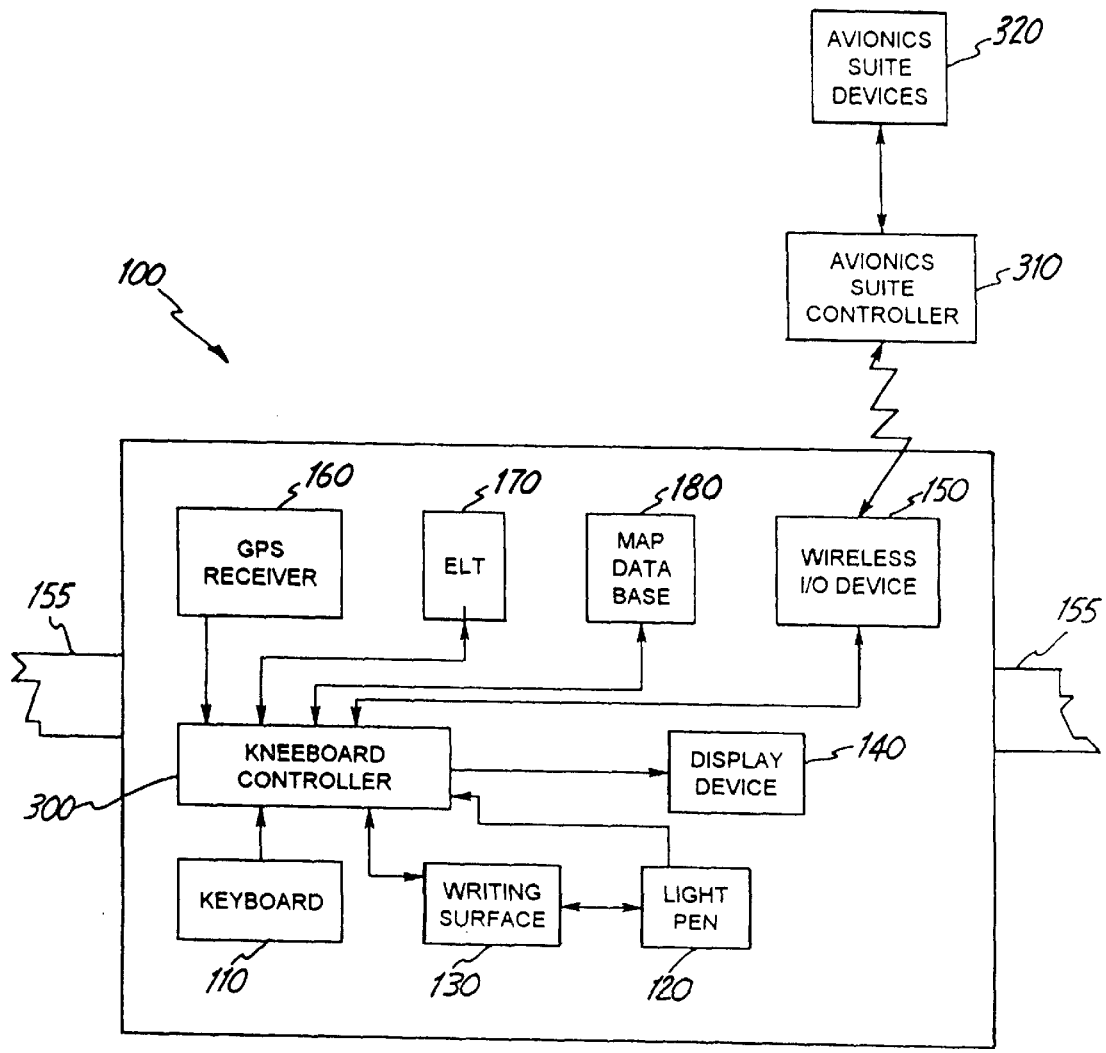
FIG. 2 is a block diagram illustrating the avionics kneeboard interface device of the present invention used to control the avionics suite of an aircraft.

FIG. 2 is a diagrammatic illustration of kneeboard 100 being used to control the avionics suite of an aircraft. As shown in FIG. 2, kneeboard 100 also includes a kneeboard controller 300 which coordinates and controls the various functions of kneeboard 100. For example, kneeboard controller 300 is bi-directionally coupled to wireless I/O device 150 such that controller 300 can receive information from avionics suite controller 310, and such that kneeboard controller 300 can facilitate transmission of information to avionics suite controller 310. With avionics suite controller 310 coupled to avionics suite devices 320, the pilot of the aircraft can control the avionics suite devices 320 using keyboard 110, light pen 120, writing surface 130 and display device 140. As discussed previously, in some preferred embodiments, the control options are provided to the pilot by way of menu commands displayed using display device 140. Then, the pilot uses keyboard 110 or light pen 120 and writing surface 130 to select from the menu of control options. However, other information display and selection formats can be used as well.

As is also illustrated in FIG. 2, kneeboard controller 300 is coupled to GPS receiver 160, ELT 170 and map data base 180 such that kneeboard controller 300 can facilitate the various survival functions discussed above.

Using kneeboard 100 of the present invention, the disadvantages associated with existing control interface devices for avionics suite equipment being mounted in positions difficult or cumbersome to access is overcome. The kneeboard can be positioned for optimal pilot convenience. This reduces the pilot's work load and increases the pilot's situational awareness. Using kneeboard 100, the conventional avionics suite controller user interface device can be eliminated if desired. Further, if desired, pilot interface components on other avionics suite devices 320, such as bezel keys on the bezels of flight displays, can also be eliminated if desired. Finally, with GPS receiver 160 providing the pilot position information, map data base 180 providing digitally stored map information and ELT 170 transmitting emergency rescue information, keyboard 100 provides the pilot a highly useful survival tool.

Although the present invention has been described with reference to preferred embodiments, workers skilled in the art will recognize that changes may be made in form and detail without departing from the spirit and scope of the invention.

What is claimed is:

1. A kneeboard interface device for use by a pilot of an aircraft in communicating with an avionics suite controller, the kneeboard interface device comprising:
    a kneeboard controller adapted to control the kneeboard interface device;
    a wireless input/output (I/O) device coupled to the kneeboard controller and adapted to facilitate wireless communication between the kneeboard interface device and the avionics suite controller;
    a display device coupled to the kneeboard controller and adapted to display to the pilot avionics suite controller information received from the avionics suite controller; and
    an input device coupled to the kneeboard controller and adapted to receive a pilot response to the displayed avionics suite controller information, wherein the pilot response is transmitted to the avionics suite controller by the wireless I/O device to control the avionics suite.

2. The kneeboard interface device of claim 1, and further comprising an attachment mechanism adapted to attach the kneeboard interface device to a leg of the pilot in order to reduce the work load of the pilot by providing convenient access to the avionics suite controller.

3. The kneeboard interface device of claim 1, wherein the input device includes an alphanumeric keyboard.

4. The kneeboard interface device of claim 1, wherein the input device includes a light pen and corresponding electronic writing surface adapted to electronically store written messages made by the pilot.

5. The kneeboard interface device of claim 1, and further comprising a global navigational satellite system (GNSS) receiver coupled to the kneeboard controller, wherein the GNSS receiver provides to the kneeboard controller position information indicative of the position of the kneeboard interface device and which can be displayed using the display device in a survival situation.

6. The kneeboard interface device of claim 5, and further comprising a map data base coupled to the kneeboard controller, wherein using the position information provided by the GNSS receiver and map information stored in the map data base, the kneeboard controller controls the display device such that it displays map information relative to a current position of the kneeboard controller.

7. The kneeboard interface device of claim 5, and further comprising an emergency locator transmitter (ELT) adapted to transmit rescue information.

8. The kneeboard interface device of claim 7, wherein the ELT is adapted to transmit kneeboard position information as provided by the GNSS receiver.

9. An apparatus for use by a pilot of an aircraft, the apparatus comprising:
    a kneeboard having an attachment mechanism for attaching the kneeboard to a leg of the pilot;
    a kneeboard controller physically coupled to the kneeboard and adapted to control the apparatus;
    a wireless input/output (I/O) device coupled to the kneeboard controller and physically coupled to the kneeboard and adapted to facilitate wireless communication between the pilot and an avionics suite controller;
    a display device coupled to the wireless I/O device through the kneeboard controller and physically coupled to the kneeboard and adapted to display to the pilot avionics suite controller information received from the avionics suite controller by the wireless I/O device; and
    an input device coupled to the wireless I/O device through the kneeboard controller and physically coupled to the kneeboard and adapted to receive a pilot response to the displayed avionics suite controller information, wherein the pilot response received by the input device is transmitted to the avionics suite controller by the wireless I/O device to thereby facilitate control of avionics suite devices coupled to the avionics suite controller.

10. The apparatus of claim 9, wherein the input device includes an alphanumeric keyboard.

11. The apparatus of claim 10, wherein the input device further includes a light pen and corresponding electronic writing surface adapted to electronically store written messages made by the pilot.

12. The apparatus of claim 9, and further comprising a global navigational satellite system (GNSS) receiver coupled to the kneeboard controller and physically coupled to the kneeboard and adapted to provide as an output position information indicative of the position of the kneeboard, wherein the position information is displayed using the display device in a survival situation.

13. The apparatus of claim 12, and further comprising a map data base storing map information, wherein using the position information provided by the GNSS receiver and the map information stored in the map data base, the display device displays map information relative to a current position of the kneeboard.

14. The apparatus of claim 12, and further comprising an emergency locator transmitter (ELT) coupled to the kneeboard controller and physically coupled to the kneeboard and adapted to transmit rescue information.

15. The apparatus of claim 14, wherein the ELT is adapted to transmit the position information indicative of the position of the kneeboard.

16. An avionics system comprising:
   an avionics suite including a plurality of avionics devices adapted for use in piloting an aircraft;
   an avionics suite control device coupled to and controlling the plurality of avionics devices of the avionics suite;
   a kneeboard having an attachment mechanism for attaching the kneeboard to a leg of the pilot;
   a wireless input/output (I/O) device physically coupled to the kneeboard and adapted to facilitate wireless communication between the pilot and the avionics suite control device;
   a display device coupled to the wireless I/O device and physically coupled to the kneeboard and adapted to display to the pilot avionics suite information received from the avionics suite control device by the wireless I/O device;
   an input device coupled to the wireless I/O device and physically coupled to the kneeboard and adapted to receive a pilot response to the displayed avionics suite information, wherein the pilot response received by the input device is transmitted to the avionics suite control device by the wireless I/O device to thereby facilitate control of the plurality of avionics devices; and
   a kneeboard controller coupled to and adapted to control the wireless I/O device, the display device and the input device, the kneeboard controller also being physically coupled to the kneeboard.

17. The avionics system of claim 16, and further comprising a global navigational satellite system (GNSS) receiver coupled to the kneeboard controller and physically coupled to the kneeboard and adapted to provide as an output position information indicative of the position of the kneeboard, wherein the position information is displayed using the display device in a survival situation.

18. The avionics system of claim 17, and further comprising an emergency locator transmitter (ELT) coupled to the kneeboard controller and physically coupled to the kneeboard and adapted to transmit rescue information.

19. The avionics system of claim 18, wherein the ELT is adapted to transmit the position information indicative of the position of the kneeboard.

* * * * *